(12) United States Patent
Yamamoto et al.

(10) Patent No.: US 7,972,462 B2
(45) Date of Patent: Jul. 5, 2011

(54) METHOD FOR MANUFACTURING COMBINATION-TYPE OPTICAL FILM, APPARATUS FOR THE METHOD, COMBINATION-TYPE OPTICAL FILM AND IMAGE DISPLAY DEVICE

(75) Inventors: Satoru Yamamoto, Ibaraki (JP); Hiroaki Mizushima, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/299,494

(22) PCT Filed: Apr. 23, 2007

(86) PCT No.: PCT/JP2007/058755
§ 371 (c)(1),
(2), (4) Date: Nov. 4, 2008

(87) PCT Pub. No.: WO2007/129562
PCT Pub. Date: Nov. 15, 2007

(65) Prior Publication Data
US 2009/0186170 A1      Jul. 23, 2009

(30) Foreign Application Priority Data
May 9, 2006   (JP) .................................. 2006-129768

(51) Int. Cl.
*B29C 65/00*   (2006.01)
(52) U.S. Cl. .................... 156/285; 264/261; 156/304.5; 156/304.1
(58) Field of Classification Search ............. 156/285, 156/304.5, 304.1; 264/261
See application file for complete search history.

(56) References Cited

U.S. PATENT DOCUMENTS

| 5,935,377 A | 8/1999 | Sergel et al. |
| 6,055,035 A * | 4/2000 | von Gutfeld et al. ......... 349/187 |
| 6,104,457 A | 8/2000 | Izumi et al. |

(Continued)

FOREIGN PATENT DOCUMENTS

CN    1379252 A    11/2002

(Continued)

OTHER PUBLICATIONS

International Preliminary Report on Patentability of International Application No. PCT/JP2007/058755 mailed Dec. 24, 2008 with Forms PCT/IB/373 and PCT/ISA/237.

(Continued)

*Primary Examiner* — Joseph S Del Sole
*Assistant Examiner* — David N Brown, II
(74) *Attorney, Agent, or Firm* — Westerman, Hattori, Daniels & Adrian, LLP

(57) ABSTRACT

This invention provides a method for manufacturing a combination-type optical film comprising a plurality of optical films each having at least one end face at which the optical films are opposed to one another, comprising the steps of:
(1) opposing the end faces of the optical films to one another with a gap provided therebetween;
(2) entirely holding the opposed portions of the optical films with a holding member placed on at least one side;
(3) connecting an organic solvent- or adhesive-containing vessel to one side of the gap between the opposed portions of the optical films to charge the organic solvent or the adhesive into the gap with the aid of a negative pressure state; and
(4) removing the organic solvent or the adhesive under reduced pressure to bond the opposed end faces to one another.

14 Claims, 4 Drawing Sheets

U.S. PATENT DOCUMENTS

| | | |
|---|---|---|
| 6,218,679 B1 * | 4/2001 | Takahara et al. ................. 257/59 |
| 6,459,462 B1 * | 10/2002 | Seraphim et al. ................ 349/73 |
| 2001/0013920 A1 * | 8/2001 | Hashimoto et al. ............ 349/187 |
| 2002/0018173 A1 * | 2/2002 | Furukawa et al. ............. 349/187 |
| 2002/0145804 A1 | 10/2002 | Yano et al. |
| 2008/0165313 A1 * | 7/2008 | Hayashi et al. ................ 349/117 |
| 2008/0170184 A1 * | 7/2008 | Byun et al. ....................... 349/97 |
| 2009/0021677 A1 * | 1/2009 | Nakagawa et al. ............ 349/117 |
| 2009/0040433 A1 * | 2/2009 | Aiki et al. ........................ 349/75 |
| 2009/0186170 A1 * | 7/2009 | Yamamoto et al. ........... 428/1.31 |

FOREIGN PATENT DOCUMENTS

| | | |
|---|---|---|
| JP | 59-214807 A | 12/1984 |
| JP | 61-189506 A | 8/1986 |
| JP | 5-88163 A | 4/1993 |
| JP | 7-270916 A | 10/1995 |
| JP | 8-169062 A | 7/1996 |
| JP | 11-24047 | 1/1999 |
| JP | 2001-121619 A | 5/2001 |
| JP | 2002-277782 A | 9/2002 |
| JP | 2004-093825 A | 3/2004 |
| JP | 2004-253335 A | 9/2004 |
| JP | 2006-36810 A | 2/2006 |
| JP | 2006-088651 A | 4/2006 |

OTHER PUBLICATIONS

International Search Report of PCT/JP2007/058755, Mailing Date of May 29, 2007.

Japanese Office Action dated Nov. 25, 2010, issued in corresponding Japanese Patent Application No. 2007-107790.

Japanese Office Action dated Sep. 21, 2010, issued in corresponding Japanese Patent Application No. 2007-107790.

Chinese Office Action dated Mar. 16, 2011, issued in related Chinese Patent Application No. 200780014753.6.

* cited by examiner

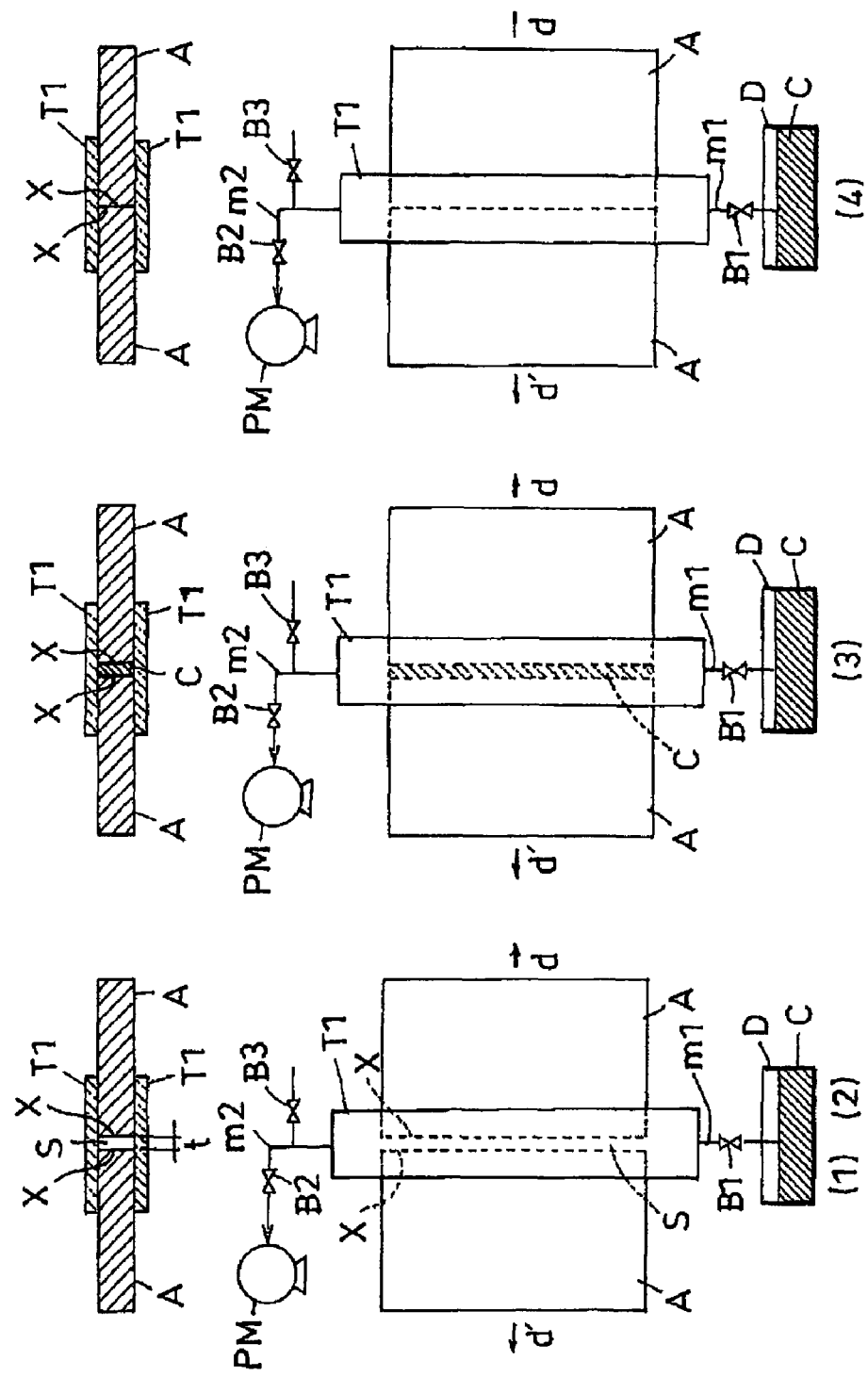
[FIG. 1]

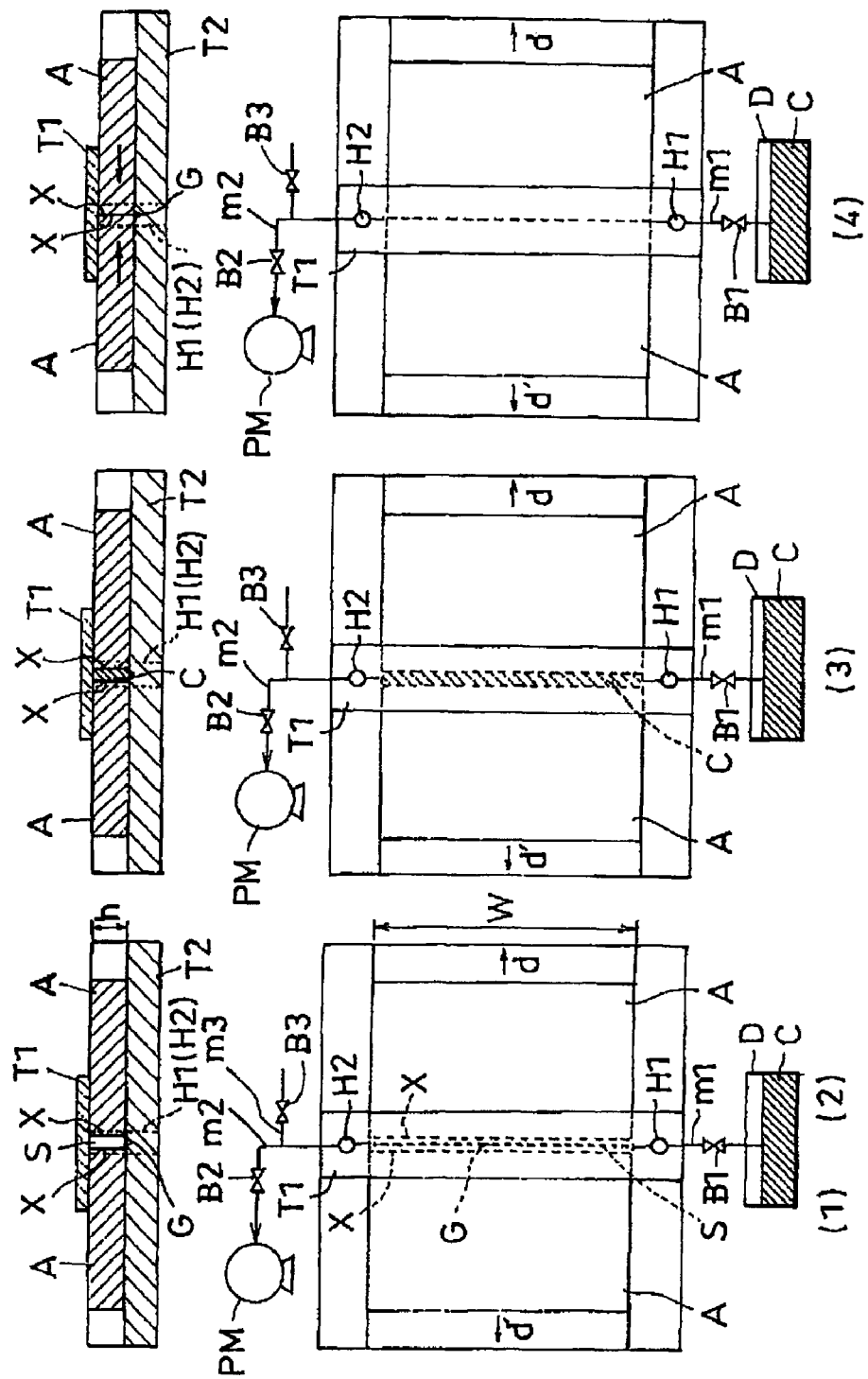
[FIG.2]

[FIG.3]
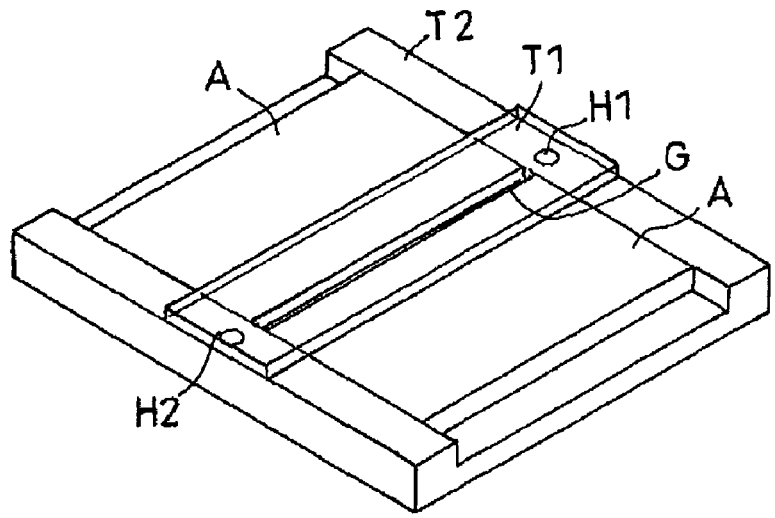
[FIG.4]
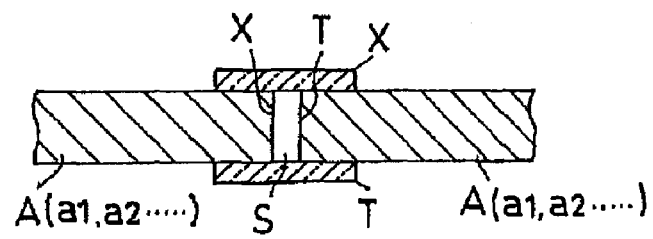
[FIG.5]
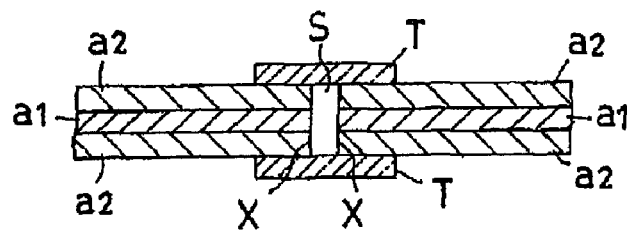
[FIG.6]
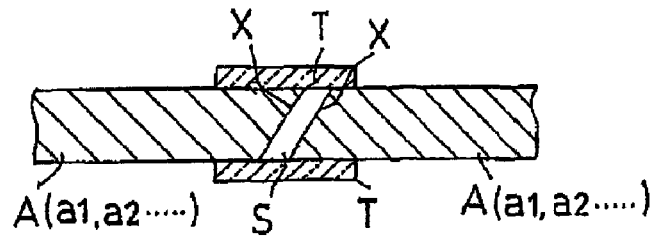

[FIG.7]
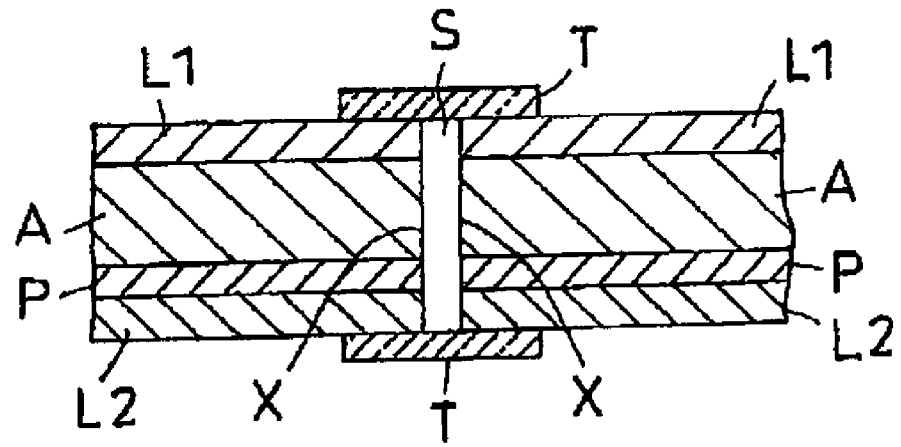
[FIG.8]
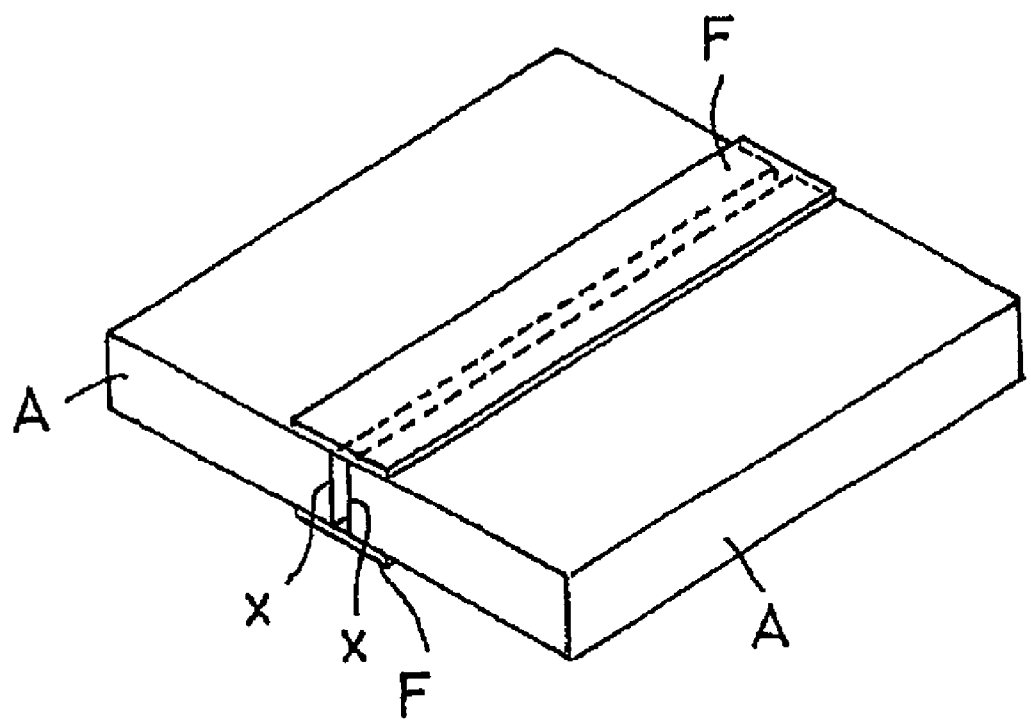

METHOD FOR MANUFACTURING COMBINATION-TYPE OPTICAL FILM, APPARATUS FOR THE METHOD, COMBINATION-TYPE OPTICAL FILM AND IMAGE DISPLAY DEVICE

TECHNICAL FIELD

The invention relates to a method for manufacturing a combination-type optical film including a plurality of optical films with their end faces opposed to one another and to an apparatus for use in the production method. The invention also relates to a combination-type optical film obtained by the production method and further to an image display device, such as a liquid crystal display device and an organic electroluminescence (EL) display device, using the combination-type optical film.

Examples of the optical film include a polarizer, a protective film to be laminated on one or both sides of a polarizer, a polarizing plate including a polarizer and the protective film laminated on one or both sides of the polarizer, a retardation plate, an optical compensation film, and a brightness enhancement film. Any one of these optical films may be used alone for the combination optical film, or a laminate of any of these optical films may be used for the combination optical film.

The optical films to be used may be protective film-carrying optical films each including an optical film and an easily-releasable protective film provided on the front surface of the optical film and/or another easily-releasable protective film (separator) provided on the back surface of the optical film through a pressure-sensitive adhesive layer.

BACKGROUND ART

Image displays such as liquid crystal displays for use in televisions, personal computers and the like use optical films such as polarizing plates. As the size of televisions and the like has grown in recent years, large-area optical films have been demanded. For the manufacture of large-area optical films, corresponding large manufacturing facilities are necessary, and a difficulty in handling for packing is associated with transportation, which requires high cost. In order to install such large manufacturing facilities, a large place is required. Thus, there has been proposed a technique in which a plurality of liquid crystal displays are arranged with their end faces butted against one another to form a large-sized liquid crystal display.

Liquid crystal displays of televisions, personal computers and the like produce a display by transmitting and blocking (absorbing) light from their back side based on the function of optical films such as polarizing plates. Thus, butting of the end faces of liquid crystal displays has a problem in which the butted portion can cause light leakage to produce a light line on the front face of liquid crystal displays. Against this problem, there is disclosed a technique in which as shown in FIG. 8, a film F is attached onto polarizing plates (optical films A) at the butted portion of liquid crystal displays (on the portion between the butted end faces x) to prevent light leakage (see Patent Literature 1 below). However, the technique of Patent Literature 1 has a problem in which the film attached to the surface of the polarizing plates can degrade the surface appearance of liquid crystal displays, although light leakage can be prevented.

Patent Literature 1: Japanese Patent Application Laid-Open (JP-A) No. 05-88163

DISCLOSURE OF INVENTION

Objects to be Achieved by the Invention

An object of the invention is to provide a method capable of efficiently manufacturing a combination-type optical film which includes a plurality of optical films with their end faces opposed to one another and in which light leakage can be prevented without degradation of the appearance.

Another object of the invention is to provide an apparatus for use in the production method, a combination-type optical film obtained by the production method, and an image display device using the combination-type optical film.

Means for Solving the Problems

As a result of investigations for solving the problems, the inventors have found that the objects can be achieved by the combination-type optical film production method and other techniques described below and have completed the invention.

Specifically, the invention is directed to a method for manufacturing a combination-type optical film including a plurality of optical films each having at least one end face at which the optical films are opposed to one another, including the steps of:

(1) opposing the end faces of the optical films to one another with a gap provided therebetween;

(2) entirely holding the opposed portions of the optical films with a holding member placed on at least one side;

(3) connecting an organic solvent- or adhesive-containing vessel to one side of the gap between the opposed portions of the optical films to charge the organic solvent or the adhesive into the gap with the aid of a negative pressure state; and (4) removing the organic solvent or the adhesive under reduced pressure to bond the opposed end faces to one another.

In the step (2) of the production method, the opposed portions of the optical films may be entirely held with holding members placed on both sides.

In the step (3) of the production method, another side of the gap, wherein the another side is not connected to the vessel, may be connected to a vacuum pump so that the organic solvent or the adhesive can be charged into the gap with the aid of the negative pressure state produced by the vacuum pump.

In the step (4) of the production method, another side of the gap, wherein the another side is not connected to the vessel, may be connected to a vacuum pump so that the organic solvent or the adhesive can be removed under reduced pressure by means of the vacuum pump, when the opposed end faces are bonded to one another.

In the production method, flat plates may be used as the holding members placed on both sides.

In the production method, the holding members placed on both sides may include an upper holding member of a flat plate and a lower holding member that is a support. The support may have a recessed cross-sectional shape. Protrusions on both sides in the recessed cross-section may have through holes, and a recessed portion in the recessed cross-section may have a groove communicating with the through holes on both sides. The end faces of the optical films may be opposed to one another so that the gap provided therebetween can be placed above the groove.

In the production method, in stead of the optical films, protective film-carrying optical films each including an optical film and an easily-releasable protective film provided on the front surface of the optical film and/or another easily-releasable protective film (separator) provided on the back surface of the optical film through a pressure-sensitive adhesive layer may be used.

According to the production method, the opposed end faces in the combination-type optical films are dissolved by the organic solvent or bonded to one another with the adhesive in the step (3) and solidified and bonded by the removal of the organic solvent or the adhesive under reduced pressure in the step (4). Therefore, the opposed portions are dissolved and bonded to one another without forming a gap or bonded to one another with the adhesive without forming a gap, so that degradation of the appearance as a result of gap formation can be prevented. In addition, since the optical films are dissolved and bonded to one another or bonded to one another with the adhesive, the visibility is not degraded. Therefore, when the combination-type optical film is used for liquid crystal display devices and the like, light emitted from the back side can be prevented from leaking without degradation of the appearance.

In the step (3) of the production method, the gap between the opposed end faces is brought into a negative pressure state by a pressure reduction process, so that the organic solvent or the adhesive is sucked and charged into the gap. Therefore, even when the gap is relatively narrow, the organic solvent or the adhesive can be efficiently charged into the gap. If an organic solvent or an adhesive is applied to the gap by coating to bond the gap, the gap will be brought into a positive pressure state. In this case, the organic solvent or the adhesive will run over the gap, and it is necessary to wipe the excess material. In contrast, according to the invention, the gap can be brought into a negative pressure state by suction or pressure reduction with a vacuum pump, and, therefore, the amount of the absorption of the organic solvent or the adhesive into the gap can be controlled, so that only the necessary amount of the organic solvent or the adhesive can be sucked and charged into the gap. Therefore, unessential operations can be omitted from the process of charging the organic solvent or the adhesive, which is advantageous in terms of workability. When protective film-carrying optical films are used, the gap being in a positive pressure state can make the organic solvent or the adhesive cause partial lift-off or separation of the protective film (separator) or any other component or can cause the organic solvent or the adhesive to penetrate between the optical film and the protective film. In contrast, according to the invention, such partial separation and so on can be prevented.

In the step (4) of the production method, the organic solvent or the adhesive may be removed from the gap under reduced pressure by means of a vacuum pump. Since the gap is charged with a relatively small amount of the organic solvent or the adhesive, the organic solvent or the adhesive can be removed with high efficiency so that the opposed end faces can be efficiently bonded to one another. In the step (4), while the organic solvent or the adhesive is removed from the gap, the gap can be brought into a negative pressure state again, so that the opposed end faces can come close to one another with the gap being narrowed. This opposed end face gathering effect allows efficient bonding between the opposed end faces. Since the opposed end faces can come close to one another with the gap being narrowed as described above, the step (4) is suited to maintain the configuration.

In a preferred mode of the production method, the opposed end faces of the optical films or the protective film-carrying optical films are each substantially perpendicular to their front and back surfaces.

While the end faces to be opposed may have various shapes, the substantially perpendicularly-shaped end faces to be opposed are easily obtained by working and easily handled when they are combined to form a combination-type optical film. Such end faces also allow easy suction of the organic solvent or the adhesive in the step (3) and allows easy removal of the organic solvent or the adhesive in the step (4).

In the production method, the opposed end faces of the optical films or the protective film-carrying optical films are each preferably flat and inclined from the front surface to the back surface of the optical film. The flat and inclined opposed end faces have a relatively large bonding area so that improved solidification or improved adhesive strength can be achieved with the organic solvent or the adhesive.

In the step (1) of the production method, the optical films or the protective film-carrying optical films are preferably opposed to one another in such a manner that the gap between the opposed end faces has a width of 50 μm or less. The amount of the organic solvent charged into the gap in the step (3) increases with increasing gap width. From this point of view, the width is preferably as small as possible, and the width is more preferably 40 μm or less. On the other hand, the gap generally has a width of 5 μm or more, preferably of 15 μm or more, in order to charge the organic solvent.

At least the surface of the holding member used in the step (2) of the production method is preferably made of a fluororesin or a silicone resin. The holding member preferably has high smoothness so that the opposed end faces can easily come close to one another when the gap between the opposed end faces is brought into a negative pressure state. Therefore, at least the surface of the holding member is preferably made of a fluororesin or a silicone resin having high smoothness. Since the holding member is brought into contact with the organic solvent, it preferably has high resistance to the organic solvent. Also from this point of view, the surface of the holding member is preferably made of a fluororesin or a silicone resin. The surface of the holding member (or the surface treating agent in cases where the holding member is surface-treated) preferably has a static friction coefficient of 0.001 to 0.5. Larger holding members used should preferably have lower static friction coefficient.

The invention is also directed to an apparatus for manufacturing a combination-type optical film including a plurality of optical films each having at least one end face at which the optical films are opposed to one another, including:

a holding member or holding members for entirely holding the opposed portions of the optical films from both sides in a state where the end faces of the optical films are opposed to one another with a gap provided therebetween;

an organic solvent- or adhesive-containing vessel to be connected to one side of the gap; and a vacuum pump to be connected to another side of the gap.

In the production apparatus, the holding members for holding from both sides may each be a flat plate.

In the production apparatus, the holding members for holding from both sides may include an upper holding member of a flat plate and a lower holding member that is a support having a recessed cross-sectional shape. Protrusions on both sides in the recessed cross-section may have through holes, and a recessed portion in the recessed cross-section may have a groove communicating with the through holes on both sides. The organic solvent- or adhesive-containing vessel may be connected to one of the through holes, and the vacuum pump may be connected to another of the through holes.

The production method of the invention can be efficiently performed with the production apparatus.

The invention is also directed to a combination-type optical film obtained by the production method.

The invention is also directed to an image display device using the combination-type optical film.

The combination-type optical film is prepared using the plurality of optical films. According to this technique, optical films of the desired size can be prepared using conventional optical films, and it can be conveniently applied for large optical films. Since each optical film can be separately transported, the combination-type optical film allows easy transportation. The opposing technique allows recycling of residues (optical films) that have odd sizes and are conventionally handled as waste materials.

BRIEF DESCRIPTION OF THE DRAWINGS

FIG. 1 is a schematic diagram showing an example of the method of the invention for manufacturing a combination-type optical film.

FIG. 2 is a schematic diagram showing another example of the method of the invention for manufacturing a combination-type optical film.

FIG. 3 is a perspective view showing an example where optical films are held with the holding members shown in FIG. 2.

FIG. 4 is a cross-sectional view showing an example of the opposed optical films for use in the production method of the invention.

FIG. 5 is a cross-sectional view showing another example of the opposed optical films for use in the production method of the invention.

FIG. 6 is a cross-sectional view showing a further example of the opposed optical films for use in the production method of the invention.

FIG. 7 is a cross-sectional view showing a further example of the opposed optical films for use in the production method of the invention.

FIG. 8 is a cross-sectional view of an example of a conventional combination-type optical film.

DESCRIPTION OF REFERENCE SYMBOLS

In the drawings, A represents optical films, X opposed end faces, L1 an easily-releasable protective film, L2 another easily-releasable protective film (separator), P a pressure-sensitive adhesive layer, T1 a holding member (a flat plate), T2 another holding member (a support), PM a vacuum pump, C an organic solvent or an adhesive, s a gap, and F a film.

BEST MODE FOR CARRYING OUT THE INVENTION

The method of the invention for manufacturing the combination-type optical film is described below with reference to the drawings.

When the combination-type optical film is produced according to the invention, the sizes of the optical films to be combined may each be adjusted depending on the size of the combination-type optical film to be produced. There is no particular limitation to the number of the optical films to be combined. While there is no limitation to the size of the combination-type optical film to be produced, a combination-type optical film of a large size of 65 inches or more (or with a length of 800 mm or more and a width of 1350 mm or more) is effectively produced. On the other hand, even when a relatively small combination-type optical film is produced, there is provided the advantage that each optical film can be easily transported or transferred.

The production method of the invention is for manufacturing a combination-type optical film including a plurality of optical films each having at least one end face at which the optical films are opposed to one another includes the steps of:

(1) opposing the end faces of the optical films to one another with a gap provided therebetween;

(2) entirely holding the opposed portions of the optical films with a holding member placed on at least one side;

(3) connecting an organic solvent- or adhesive-containing vessel to one side of the gap between the opposed portions of the optical films to charge the organic solvent or the adhesive into the gap with the aid of a negative pressure state; and (4) removing the organic solvent or the adhesive under reduced pressure to bond the opposed end faces to one another.

For example, the method of the invention for manufacturing the combination-type optical film may be performed as shown in FIG. 1 or 2. FIGS. 1 and 2 each have parts (1) to (4) corresponding to the steps (1) to (4). FIGS. 1 and 2 each provide a top view showing the application of the combination-type optical film to a production apparatus. Above the top view, FIGS. 1 and 2 also each provide a cross-sectional view along line d-d' of the top view.

The production apparatus shown in FIG. 1 includes a pair of holding members T1 to entirely hold, from both sides, the opposed portions of the optical films A in such a state that the end faces x of the optical films A are opposed to each other with a gap s interposed therebetween. A flat plate is used as each of the holding members T1. The apparatus also includes a vessel D containing an organic solvent or adhesive C, which is placed in the region where the gap s is provided so that it can be connected to one side of the gap s. While the end faces x of the optical films A are opposed to each other, the gap s is connected to the organic solvent or adhesive C through a line m1. The line m1 has a valve B1. The apparatus also includes a vacuum pump PM that is provided so as to be connected to the gap s on the other side of the gap s. The gap s is connected to the vacuum pump PM through a line m2. The line m2 may also have a valve B2. The line m2 may also be provided with an auxiliary line m3 having a valve B3. The lines m1 and m2 are configured such that the gap s is sealed with the holding members T1.

The production apparatus shown in FIG. 2 includes a pair of holding members T1 and T2 to entirely hold, from both sides, the opposed portions of the optical films A in such a state that the end faces x of the optical films A are opposed to each other with a gap s interposed therebetween. A flat plate is used as the holding member T1. The holding member T2 is a support having a recessed cross-sectional shape, and the optical films A are placed in the recessed portion. Protrusions on both sides in the recessed cross-section have a height h substantially the same as the thickness of the optical films A so that the gap s can be sealed. The recessed portion preferably has a width w substantially the same as that of the optical films A. The protrusions on both sides in the recessed cross-section have through holes H1 and H2 vertically passing through the holding member T2, and the recessed portion in the recessed cross-section has a groove G communicating with the through holes H1 and H2 on both sides. The end faces x of the optical films A are opposed to each other so that the gap s provided therebetween is placed above the groove G. After the optical films A are opposed to each other and placed in the recessed portion of the holding member T2 as described above, the holding member T1 is placed.

The through hole H1 (inlet) and the through hole H2 (outlet) communicate with the gap s through the groove G placed under the gap s. The through hole H1 (inlet) is connected to a vessel D containing an organic solvent or adhesive C so that one side of the gap s is connected to the vessel D. While the end faces x of the optical films A are opposed to each other, the gap s is connected to the organic solvent or adhesive C through a line m1. The line m1 has a valve B1. The through hole H2 (outlet) is connected to a vacuum pump PM so that the other side of the gap s is connected to the vacuum pump PM. The gap s is connected to the vacuum pump PM through a line m2. The line m2 may also have a valve B2. The line m2 may also be provided with an auxiliary line m3 having a valve B3. The lines m1 and m2 are configured such that the gap s is sealed with the holding member T1. The pump PM and the vessel D are placed below the through hole H1 (inlet) and the through hole H2 (outlet). FIG. 3 is a perspective view showing the structure having the optical films A that are opposed to each other and sandwiched or held between the holding members T1 and T2.

FIGS. 1 and 2 each illustrate a case where two optical films A each with an end face x to be opposed are combined and opposed to each other to form an combination-type optical film in which the gap s between the opposed end faces x is filled to form a junction. The front and back surfaces of the optical film A are interchangeable, and any one side may be the front or back surface. The opposed end faces x are preferably processed with high precision by cutting, polishing or any other method.

While there is no particular limitation to the opposed end faces x in the combination-type optical film, each of the opposed end faces x may be substantially perpendicular to the front and back surfaces of the optical film A as shown in FIG. 1 or 2. Alternatively, each of the opposed end faces x may be flat and inclined from the front surface to the back surface of the optical film A. Any other end face form may also be employed.

The same optical films A are generally used to be combined. In each drawing, a pair of optical films A shown on the left and right sides are preferably the same.

The optical film A may be any of various types. FIGS. 1 and 2 each show a case where a single layer is used for the optical film A. The optical film A to be used may be a single layer or a laminate of two or more layers as shown in FIG. 4. FIG. 5 illustrates an optical film A including an optical film a1 and optical films a2 placed on both sides of the optical film a1. In FIG. 5, for example, a1 represents a polarizer, and a2 represents a protective film for the polarizer, so that the optical film A is a polarizing plate including the polarizer and the protective films placed on both sides of the polarizer. In FIG. 5, the laminate may use an adhesive or a pressure-sensitive adhesive, but such an adhesive is omitted from FIG. 5. Besides the examples described above, the optical film may also be a retardation plate, an optical compensation film, a brightness enhancement film, or the like. These modes may also apply to the optical films A shown in other drawings. FIGS. 4 and 5 each illustrate another mode of the optical film A shown in the cross-sectional view part (1) or (2) of FIG. 1 or 2, and the optical films shown in FIG. 4 or 5 may also be subjected to the process shown in FIG. 1 or 2. FIG. 6 shows a case where in the mode shown in FIG. 4, each of the opposed end faces x is flat and inclined from the front surface to the back surface of the optical film A is used.

FIG. 7 illustrates a case where protective film-carrying optical films A' are used in place of the optical films A shown in the cross-sectional view part (1) or (2) of FIG. 1 or 2. The optical films shown in FIG. 7 may also be subjected to the process shown in FIG. 1 or 2.

In the protective film-carrying optical film A', an easily-releasable protective film L1 is provided on the front surface of the optical film A, and another easily-releasable protective film (separator) L2 is provided on the back surface of the optical film A through a pressure-sensitive adhesive layer P. While the protective films L1 and L2 are provided on both sides of the optical film A in FIG. 7, any one of them may be provided on only one side.

The easily-releasable protective film L1 to be used is generally a laminate including a base film and an easily-releasable pressure-sensitive adhesive layer laminated thereon. The easily-releasable protective film (separator) L2 for the pressure-sensitive adhesive layer P can be separated and removed from the pressure-sensitive adhesive P at the adhesive interface. In contrast, the protective film L1 is generally a laminate of a base film and an easily-releasable pressure-sensitive adhesive layer, in which the pressure-sensitive adhesive layer can be separated and removed together with the base film.

FIGS. 1 to 7 each show a case where two optical films A or two protective film-carrying optical films A' are combined. Alternatively, two or more optical films A may be combined lengthwise and/or transversely (four or more optical films A in total).

In the production method of the invention, the steps (1) and (2) are first performed. Parts (1) and (2) of FIG. 1 or 2 show the steps (1) and (2), respectively. In the step (1), the end faces x of the optical films A are opposed to one another with a gap s provided therebetween. In the step (2), the opposed portions of the optical films A are entirely held from both sides by holding members. In FIG. 1, a pair of holding members T1 is used. In FIG. 2, a holding member T1 and another holding member T2 are used. The gap s between the opposed portions, exclusive of both ends thereof, is sealed with the holding members. The steps (1) and (2) may be sequentially performed. Alternatively, the optical films A may be placed on one of the holding members in the step (1), and then the other of the holding members may be placed to hold the optical films so that the step (2) may be completed. In the embodiment shown in FIG. 2, the optical films A are preferably placed in the recessed portion of the holding member T2, and then the holding member T1 is preferably placed on the already placed optical films A. Specifically, the vacuum pump PM is not driven in either of the steps (1) and (2). Each of the valves B1 to B3 is generally closed.

In general, the width t of the gap s between the opposed end faces x as shown in part (1) or (2) of FIG. 1 is preferably 50 μm or less as stated above.

The holding members T1 and T2 to be used are each preferably made of a fluororesin or a silicone resin as stated above. The holding member T1 is generally a flat plate whose thickness is preferably from about 0.1 to about 5 mm in view of easy handling. The holding member T1 to be used should have a length longer than one side of each of the opposed end faces of the optical films A so that the gap s between the opposed portions of the optical films A can be entirely covered. In general, the holding member T1 to be used is preferably about 10 to about 60% longer than the width of the optical films A to be opposed. When used in the embodiment shown in FIG. 2, the holding member preferably has a width such that the through holes H1 and H2 can also be covered with it. In a preferred mode, the holding member T1 is soft and has a rough surface or is hard and has a smooth surface. A holding member that is soft and has a smooth surface may also be used. However, such a holding member can bite into the gap s and should be used together with a reinforcing material. A holding member that is hard and has a rough surface is difficult to use. The holding member T1 is preferably transparent so that the opposed portions can be observed. Besides the above, a glass plate, a solvent-resistant resin plate or the like may also be used to make the holding member T1.

On the other hand, the holding member T2 is preferably such that it is capable of forming a recessed portion and less likely to be deformed. The protruding portion of the recessed cross-sectional shape of the holding member T2 preferably has a thickness of about 1 to about 30 mm. Besides the materials described above, a solvent-resistant resin plate, a metal plate, a ceramic plate, or the like may be used to make the holding member T2. The resin plate is easy to work, and the metal plate has preferred durability. The width and depth of the groove G formed in the holding member T2 is preferably designed in such a range that the organic solvent or adhesive can flow through the groove G and that part of the optical films A will not come into the groove G, although they depend on the rigidity of the optical films A to be joined. The width and depth of the groove G are each preferably from about 0.5 to about 3 mm.

In the step (3), the organic solvent or adhesive C is then charged into the gap s with the aid of a negative pressure state produced by the vacuum pump PM. The end faces x of the optical films A are dissolved by the organic solvent or bonded to one another with the adhesive. Part (3) of FIG. 1 or 2 shows that the gap s is charged with the organic solvent or adhesive C. For example, the gap s charged with the organic solvent or adhesive C may be ensured by allowing an excessive amount of the organic solvent or adhesive C to flow out of the outlet (on the vacuum pump side).

Any of various means may be used to charge the organic solvent or adhesive C into the gap s. As shown in parts (1) and (2) of FIG. 1 or 2, for example, the valves B1 and B3 are closed, while the valve B2 is opened, so that the gap s is brought into a negative pressure state by the operation of the vacuum pump PM. Subsequently, the valve B2 is closed, and the valve B1 is opened, so that the solvent or adhesive C is charged into the gap s in the negative pressure state. The loading amount may be appropriately controlled by control of the valve B1 in the process of charging or loading the organic solvent or adhesive C. Alternatively, the loading amount may be appropriately controlled by the valves B1 and B3, while the valve B2 is closed. Alternatively, the valves B1 and B2 may be opened, and the valve B3 may be closed, so that the organic solvent or adhesive can be charged into the gap s being brought into a negative pressure state.

In the process of bringing the gap s into a negative pressure state by means of the vacuum pump PM, the pressure may be reduced to such a level that the organic solvent or adhesive C can be charged into the gap and that the gap s can be maintained. In the step (3), the negative pressure should be at a level such that it is lower than that in the step (4) and that the optical films do not move toward the suction side. In general, the negative pressure is preferably from about −0.001 to about −0.03 PaG, depending on the size of the optical films to be combined.

There is no particular limitation to the vacuum pump PM, and any appropriate commercially-available pump such as an oil-sealed rotary vacuum pump or an oil diffusion pump may be used, depending on the desired level of the reduced pressure.

In the step (3) as shown in part (3) of FIG. 1, the gap s is charged with the organic solvent C so that the end faces x of the optical films A are dissolved, or the end faces x of the optical films A are bonded to one another with the adhesive C.

The organic solvent C may be appropriately determined depending on the type of the optical films A. When triacetylcellulose is used for the optical films (protective films for a polarizer), examples of the organic solvent include halide solvents, ester solvents, and ketone solvents. In particular, methylene chloride, methylene chloride, and ethyl acetate have high solubilizing power. When norbornene resins are used for the optical films (protective films for a polarizer), examples of the organic solvent include hydrocarbon solvents. In particular, hexane, heptane, octane, and the like are preferred in terms of solubilizing power. The adhesive C to be used may be any of various adhesives dissolved in the organic solvent. Alternatively, the adhesive to be used may be a solution of the optical film-forming material dissolved in the organic solvent.

The time period for which the end faces x of the optical films A are dissolved with the organic solvent or adhesive C charged into the gap s is generally from 0.1 to 30 seconds, preferably from about 0.1 to about 10 seconds, while it may be appropriately set depending on the type of the optical films A or the organic solvent or adhesive C.

In the step (2) or (3), any means other than the above may also be used. For example, the step (1) may be performed on a stationary table, and then in the step (2), the opposed portions of the optical films may be entirely covered with a holding member placed on only one side. In this case, the other side is covered with the stationary table, and, therefore, the holding member only has to be placed on one side. Subsequently in the step (3), the holding member may be pulled into a protruding shape so that the gap s can be brought into a negative pressure state, with the aid of which an organic solvent or adhesive can be charged into the gap s. In order to bring the gap s into a negative pressure state by pulling the holding member, the holding member should be made of a soft or flexible material.

Subsequently in the step (4) as shown in part (4) of FIG. 1, the organic solvent or adhesive C is removed under reduced pressure by means of the vacuum pump PM so that the opposed end faces x are solidified and joined. The reduced pressure allows the opposed end faces x to gather and solidify and to be joined. In the process of removing the organic solvent or adhesive C under reduced pressure, the valves B1 and B3 are closed, while the valve B2 is opened. The reduced pressure allows the removal of the organic solvent from the opposed end faces x and the solidification of the opposed end faces x. There is no need to completely remove the organic solvent or adhesive from the opposed end faces x. The organic solvent or adhesive may be removed to such an extent that the opposed end faces x can be solidified.

In the process of removing the organic solvent C under reduced pressure by means of the vacuum pump PM, a reduced pressure is applied such that the organic solvent or adhesive C can be removed and that the opposed end faces x can be joined. In general, a negative pressure of about −0.01 to about −0.07 PaG is preferably applied. In order to allow the end faces x of the optical films A to gather, the magnitude of the reduced pressure should be greater in the step (4) than in the step (3) (the process of bringing the gap s into a negative pressure state).

The combination-type optical film obtained as described above is taken out of the production apparatus and used for various applications. Examples of optical films that may be used in an embodiment of the invention are illustrated below.

Any type of optical film for use in forming image displays such as liquid crystal displays may be used without particular limitations. For example, the optical film may be a polarizing plate. In generally, a polarizing plate, which comprises a polarizer and a transparent protective film provided on one or both sides of the polarizer, is used. Alternatively, a polarizer and a transparent protective film may be used as individual optical films.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate or zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylene naphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The polarizer and the transparent protective film are generally bonded together with an adhesive layer. Thermosetting resins or ultraviolet curing resins such as (meth)acrylic, urethane, acrylic urethane, epoxy, or silicone resins may be used for the transparent protective film. The transparent protective film may also contain at least one type of any appropriate additive. Examples of such an additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is less than 50% by weight, high transparency and other properties inherent in the thermoplastic resin may be insufficiently exhibited.

The transparent protective film may also be a polymer film as disclosed in JP-A No. 2001-343529 (WO01/37007), such as a resin composition including: (A) a thermoplastic resin having a substituted and/or unsubstituted imide group in the side chain; and (B) a thermoplastic resin having a substituted and/or unsubstituted phenyl and nitrile groups in the side chain. Examples thereof include films of a resin composition containing an isobutylene-N-methylmaleimide alternating copolymer and an acrylonitrile-styrene copolymer. The film may be a product formed by mixing and extruding the resin composition. These films have relatively low retardation and relatively low photoelastic coefficient so that they can cancel defects such as unevenness due to distortion of the polarizing plate. These films also have low water-vapor permeability and thus high durability to moisture.

The thickness of the transparent protective film may be determined as appropriate. In view of strength, workability such as handleability, thin layer properties and so on, the thickness of the transparent protective film is generally from about 1 to about 500 μm, particularly preferably from 1 to 300 μm, more preferably from 5 to 200 μm. The transparent protective film with a thickness of 5 to 150 μm is particularly suitable.

When a transparent protective film is provided on both sides of the polarizer, transparent protective films made of the same polymer material or different polymer materials may be used on the front and back sides, respectively.

At least one selected from a cellulose resin, a polycarbonate resin, a cyclic polyolefin resin, and a (meth)acrylic resin is preferably used for the transparent protective film.

The cellulose resin includes an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Triacetyl cellulose has many commercially available sources and is advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with a relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for about 3 to about 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for about 3 to about 10 minutes), and then separating the coating.

The cellulose resin film with a relatively small thickness direction retardation to be used may be a fatty acid cellulose resin film with a controlled degree of fat substitution. Triacetyl cellulose for general use has a degree of acetic acid substitution of about 2.8. Preferably, however, the degree of acetic acid substitution is controlled to 1.8 to 2.7, so that the Rth can be reduced. The Rth may also be controlled to be low by adding a plasticizer such as dibutyl phthalate, p-toluenesulfonanilide, or acetyl triethyl citrate, to the fatty acid-substituted cellulose resin. The plasticizer is preferably added in amount of 40 parts by weight or less, more preferably of 1 to 20 parts by weight, even more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Cyclic polyolefin resins have various commercially available sources. Examples thereof include Zeonex™ and Zeonor™ series manufactured by Nippon Zeon Co., Ltd., Arton™ series manufactured by JSR Corporation, Topas™ series manufactured by Ticona, and Apel™ series manufactured by Mitsui Chemicals, Inc.

The (meth)acrylic resin preferably has a glass transition temperature (Tg) of 115° C. or more, more preferably of 120° C. or more, even more preferably of 125° C. or more, particularly preferably of 130° C. or more. If the Tg is 115° C. or more, the resulting polarizing plate can have high durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate ester copolymers, methyl methacrylate-acrylate ester-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by formula 1:

[Formula 1]

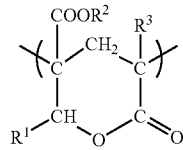

In the formula, $R^1$, $R^2$ and $R^3$ each independently represent a hydrogen atom or an organic residue of 1 to 20 carbon atoms. The organic residue may contain an oxygen atom(s).

The content of the lactone ring structure represented by formula 1 in the lactone ring structure-containing (meth)acrylic resin is preferably from 5 to 90% by weight, more preferably from 10 to 70% by weight, even more preferably from 10 to 60% by weight, particularly preferably from 10 to 50% by weight. If the content of the lactone ring structure represented by formula 1 in the lactone ring structure-containing (meth)acrylic resin is less than 5% by weight, its heat resistance, solvent resistance or surface hardness can be insufficient. If the content of the lactone ring structure represented by formula 1 in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, even more preferably of 10,000 to 500,000, particularly preferably of 50,000 to 500,000. Mass average molecular weights outside the above range are not preferred in view of formability or workability.

The lactone ring structure-containing (meth)acrylic resin preferably has a Tg of 115° C. or more, more preferably of 120° C. or more, even more preferably of 125° C. or more, particularly preferably of 130° C. or more. For example, the resin with a Tg of 115° C. or more can produce high durability, when it is incorporated in the form of a transparent protective film in a polarizing plate. The upper limit to the Tg of the lactone ring structure-containing (meth)acrylic resin is preferably, but not limited to, 170° C. or less, in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, even more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)d, the thickness direction retardation Rth is expressed by the formula Rth=

(nx−nz)d, and the Nz coefficient is expressed by the formula Nz=(nx−nz)/(nx−ny), wherein nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Concerning the invention, retardation values were measured at a wavelength of 590 nm with a retardation analyzer (KOBRA 21-ADH (trade name) manufactured by Oji Scientific Instruments) based on the principle of parallel nicols rotation method. The transparent protective film should preferably be as colorless as possible. The transparent protective film to be used preferably has a retardation of −90 nm to +75 nm in its thickness direction. If the transparent protective film used has a retardation (Rth) of −90 nm to +75 nm in the thickness direction, discoloration (optical discoloration) of the polarizing plate, which would otherwise be caused by the transparent protective film, can be almost avoided. The thickness direction retardation (Rth) is more preferably from −80 nm to +60 nm, particularly preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled to be in the range of 40 to 200 nm, and the thickness direction retardation is generally controlled to be in the range of 80 to 300 nm. The retardation plate for use as the transparent protective film also has the function of the transparent protective film and thus can contribute to a reduction in thickness. Alternatively, the retardation plate described later may also be used.

The above-mentioned polarizer and the protective film are usually adhered with aqueous adhesives or the like. As the aqueous adhesives, isocyanate based adhesives, polyvinyl alcohol based adhesives, gelatin based adhesives, vinyl based latex based, aqueous polyurethane based adhesives, aqueous polyester based adhesives, and etc. may be exemplified. Besides the above, the adhesive for bonding the polarizer to the transparent protective film may be an ultraviolet-curable adhesive, an electron beam-curable adhesive or the like.

As the opposite side of the polarizing-adhering surface of the transparent protective film, a film treated with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles (including beads) comprising cross-linked or non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 40 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the transparent protective film itself, and also they may be prepared as an optical layer different from the transparent protective film.

Further an optical film of the invention may be used as other optical layers, such as a reflective plate, a transflective plate, a retardation plate (a half wavelength plate and a quarter wavelength plate included), and a viewing angle compensation film, a brightness enhancement film, which may be used for formation of a liquid crystal display etc. These are used in practice as an optical film, or as one layer or two layers or more of optical layers laminated with polarizing plate.

Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarizing plate or circularly polarizing plate on which the retardation plate is laminated to the polarizing plates will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without coloring mentioned below by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 20 to 150 µm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyaryl sulfones, polyamides, polyimides, polyolefins, polyvinyl chlorides, cellulose type polymers, norbornene type resins, bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, are obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates are laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate include a retardation plate, an orientation film of a liquid crystal polymer, or an orientation layer of a liquid crystal polymer supported on a transparent substrate. Ordinary retardation plate is a polymer film having birefringence property that is processed by uniaxially stretching in the plane direction, while the viewing angle compensation retardation plate used is a bidirectional stretched film having birefringence property that is processed by biaxially stretching in the plane direction, or a film, which is controlled the refractive index in the thickness direction, that is processed by uniaxially stretching in the plane direction and is processed by stretching in the thickness direction, and inclined orientation film. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. As raw material polymers of the retardation plate, the same polymers the described above is used. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; a film that has the characteristics of reflecting a circularly polarized light with either left-handed or right-handed rotation and transmitting other light, such as an aligned film of cholesteric liquid-crystal polymer or a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing process ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

A pressure-sensitive adhesive layer for adhering to any other component such as a liquid crystal cell may also be formed on one or both sides of the optical film. Such a pressure-sensitive adhesive layer may also be used for the lamination of optical films, and a separator may be provided on the pressure-sensitive adhesive layer. In FIG. 7, an easily peelable protective film (separator) L2 is provided for a pressure-sensitive adhesive layer P.

As pressure-sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be provided on one side or both sides of a polarizing plate or an optical film as a layer in which pressure-sensitive adhesives with different composition or different kind etc. are laminated together. When provided on both sides, the pressure-sensitive adhesive layers may differ in composition, type, thickness or the like between the front and back sides of the polarizing plate or the optical film. Thickness of a pressure-sensitive adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that are coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In order to protect the optical film itself, an easily peelable protective film may be provided on the optical film. In FIG. 7, an easily peelable protective film L1 is provided.

While the protective film may be formed only of a base film, it generally comprises a base film and a pressure-sensitive adhesive layer that is formed on the base film such that it can be peeled together with the base film from the optical film.

In addition, in the present invention, ultraviolet absorbing property may be given to the above-mentioned optical film, and the pressure-sensitive adhesive layer etc., using a method of adding UV absorbents, such as salicylic acid ester type compounds, benzophenol type compounds, benzotriazol type compounds, cyano acrylate type compounds, and nickel complex salt type compounds.

The combination optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the combination optical film and optionally other components such as a lighting system and incorporating a driving circuit according to any conventional technique, except using the combination optical film or the laminated combination optical film of the invention. Any type of liquid crystal cell may also be used such as a TN type, an STN type and a n type.

Suitable liquid crystal displays, such as liquid crystal display with which the combination optical film has been located at one side or both sides of the liquid crystal cell, and with which a backlight or a reflective plate is used for a lighting system may be manufactured. In this case, the combination optical film or the laminated combination optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. The optical film (including the polarizing plate) of the present is applied to the organic EL display. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and many compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

EXAMPLES

The invention is more specifically described with the examples below which are not intended to limit the scope of the invention.
Polarizing Plate
A triacetylcellulose as a protective film (80 µm in thickness) was bonded to both sides of a polyvinyl alcohol polarizer (25 µm in thickness) with a polyvinyl alcohol adhesive. The resulting laminate was used as a polarizing plate.

An easily-releasable protective film (PPF100T, 59 µm in thickness, manufactured by Nitto Denko Corporation) was attached to the front surface of the polarizing plate, while another easily-releasable protective film (a separator 38 µm in thickness) was attached to the back surface of the polarizing plate through a pressure-sensitive adhesive layer (an acrylic pressure-sensitive adhesive manufactured by Nitto Denko Corporation, 23 µm in dry thickness), so that a protective film-carrying polarizing plate was obtained.

One end face (long side) of the protective film-carrying polarizing plate (100 mm in length, 50 mm in width) was shaped to be parallel to the normal direction of the polarizing plate.
Holding Members
An upper holding member (a flat plate) used was a glass plate, 150 mm×50 mm in size, 3 mm in thickness. A lower holing member (a support) used was a polytetrafluoroethylene plate, 150 mm×150 mm in size, 15 mm in thickness, having a recessed cross-sectional shape. The lower holding member had protruding portions with a height (h) of 305 µm on both sides and a recessed portion with a length of 150 mm and a width (w) of 100 mm. The recessed portion had a groove with a width of 1 mm and a depth of 1 mm.

Example 1

A combination-type polarizing plate was prepared as shown in FIG. 2. The shaped end faces (perpendicular end faces) of the protective film-carrying polarizing plates were opposed to each other in the recessed portion of the lower holding member. A gap s with a width t of 25 μm was provided between the opposed end faces. The opposed portions of the shaped end faces were entirely covered and sealed with the holding member T1. One side of the gap s between the opposed portions was connected to a vessel containing an organic solvent (methylene chloride) through a line. The other side of the gap s was connected to a vacuum pump (a Goethe type rotary blade vacuum pump, G-100D manufactured by ULVAC KICO Inc.) through a line.

Thereafter, the valves B1 and B3 were closed, while the valve B2 was opened. A pressure reduction process was performed with the vacuum pump (under a negative pressure of −0.01 PaG) so that the gap s was brought into a negative pressure state. The valve B2 was then closed. While the valve B1 was gradually opened, the organic solvent was charged into the gap s. Thereafter, the valve B1 was closed, and the valve B2 was opened. A pressure reduction process was performed with the vacuum pump (under a negative pressure of −0.05 PaG) to remove the organic solvent. As a result, the opposed end faces were solidified so that a combination-type polarizing plate according to the invention was prepared. As a result of the pressure reduction, the opposed end faces were allowed to gather and joined to each other.

Comparative Example 1

The process of Example 1 was replaced by the process of simply butting the shaped end faces of the protective film-carrying polarizing plates against each other to form a combination-type polarizing plate.

Comparative Example 2

The shaped end faces (perpendicular end faces) of the protective film-carrying polarizing plates as used in Example 1 were opposed to each other. Methylene chloride was applied and adapted to the gap between the opposed portions with a brush to dissolve the triacetylcellulose. Thereafter, the opposed portions were dried so that they were solidified and joined to form a combination-type polarizing plate.
Evaluations The combination-type polarizing plates obtained in the examples and the comparative examples were evaluated as described below. The results are shown in Table 1.

A polarizing plate (NPF-SEG1224DU manufactured by Nitto Denko Corporation) was bonded to one side (viewer side) of a liquid crystal cell (prepared by separating optical films such as polarizing plates and retardation plates from the liquid crystal panel of AQUOS LC-26GD1 manufactured by Sharp Corporation), and the combination-type polarizing plate was bonded to the other side (backlight side) to form a liquid crystal panel. The polarizing plates on both sides of the liquid crystal cell were placed in the cross Nicol configuration. The combination-type polarizing plate side of the liquid crystal panel was placed on a backlight (separated from LC-26GD1 as similar to the above) so that a liquid crystal display device was prepared. In the liquid crystal display device with the power turned on, light leakage from the gap (the joint) was visually evaluated according to the criteria below, when white or black was displayed on the screen.
Visual Evaluation Criteria The sample was placed 50 cm from the viewer, and light leakage from the joint was visually evaluated on the following three scales: o, No light leakage from the joint was visually recognized, when the front was observed; Δ, Light leakage from the joint was slightly visually recognized, when the front was observed; x, Light leakage was clearly visually recognized, when the front was observed.
Brightness The central brightness A ($cd/cm^2$) of the joint and the peripheral brightness B ($cd/cm^2$) were measured with a brightness photometer (CA-1500 manufactured by Minolta Corporation). The difference between these values (central brightness A-peripheral brightness B) was calculated. In the combination-type optical film polarizing plate, the central brightness A was measured with respect to the joint, while the peripheral brightness B was measured with respect to the portion other than the joint.

TABLE 1

| | | Brightness | | |
| --- | --- | --- | --- | --- |
| | Visual Evaluation | Central Brightness A ($cd/cm^2$) | Peripheral Brightness B ($cd/cm^2$) | Difference (A − B) ($cd/cm^2$) |
| Example 1 | o | 0.4 | 0.4 | 0 |
| Comparative Example 1 | x | 25 | 0.4 | 24.6 |
| Comparative Example 2 | o | 12 | 0.4 | 11.6 |

The invention claimed is:

1. A method for manufacturing a combination-type optical film comprising a plurality of optical films each having at least one end face at which the optical films are opposed to one another, comprising the steps of:
   (1) opposing the end faces of the optical films to one another with a gap provided therebetween;
   (2) holding the opposed portions of the optical films with a holding member placed on at least one side;
   (3) connecting an organic solvent- or adhesive-containing vessel to one side of the gap between the opposed portions of the optical films to charge the organic solvent or the adhesive into the gap with the aid of a negative pressure state, wherein an other side of the gap is not connected to the vessel and the other side of the gap is connected to a vacuum pump so that the organic solvent or the adhesive is charged into the gap with the aid of the negative pressure state produced by the vacuum pump; and
   (4) removing the organic solvent or the adhesive under reduced pressure to bond the opposed end faces to one another, wherein the gap between the opposed end faces is narrowed.

2. The method of claim 1, wherein in the step (2), the opposed portions of the optical films are entirely held with holding members placed on both sides.

3. A method for manufacturing a combination-type optical film comprising a plurality of optical films each having at least one end face at which the optical films are opposed to one another, comprising the steps of:
   (1) opposing the end faces of the optical films to one another with a gap provided therebetween;
   (2) holding the opposed portions of the optical films with a holding member placed on at least one side;
   (3) connecting an organic solvent- or adhesive-containing vessel to one side of the gap between the opposed portions of the optical films to charge the organic solvent or the adhesive into the gap with the aid of a negative pressure state; and (4) removing the organic solvent or the adhesive under reduced pressure to bond the opposed end faces to one another, wherein the gap between the opposed end faces is narrowed, and wherein in the step (4) an other side of the gap is not connected to the vessel and the other side of the gap is connected to a vacuum pump so that the organic solvent or the adhesive is removed under reduced pressure by means of the vacuum pump, when the opposed end faces are bonded to one another.

4. The method of claim 2, wherein each of the holding members placed on both sides is a flat plate.

5. A method for manufacturing a combination-type optical film comprising a plurality of optical films each having at least one end face at which the optical films are opposed to one another, comprising the steps of:
 (1) opposing the end faces of the optical films to one another with a gap provided therebetween;
 (2) entirely holding the opposed portions of the optical films with a holding member placed on both sides;
 (3) connecting an organic solvent- or adhesive-containing vessel to one side of the gap between the opposed portions of the optical films to charge the organic solvent or the adhesive into the gap with the aid of a negative pressure state; and
 (4) removing the organic solvent or the adhesive under reduced pressure to bond the opposed end faces to one another,
 wherein the holding members placed on both sides include an upper holding member of a flat plate and a lower holding member that is a support having a recessed cross sectional shape,
 protrusions on both sides in the recessed cross-section have through holes,
 a recessed portion in the recessed cross-section has a groove communicating with the through holes on both sides, and
 the end faces of the optical films are opposed to one another so that the gap provided therebetween is placed above the groove.

6. A method for manufacturing a combination-type optical film comprising a plurality of protective film-carrying optical films each having at least one end face at which the protective film-carrying optical films are opposed to one another, comprising the steps of:
 (1) opposing the end faces of the protective film-carrying optical films to one another with a gap provided therebetween;
 (2) entirely holding the opposed portions of the protective film-carrying optical films with a holding member placed on at least one side;
 (3) connecting an organic solvent- or adhesive-containing vessel to one side of the gap between the opposed portions of the protective film-carrying optical films to charge the organic solvent or the adhesive into the gap with the aid of a negative pressure state; and
 (4) removing the organic solvent or the adhesive under reduced pressure to bond the opposed end faces to one another;
 wherein the protective film-carrying optical films comprise an optical film and an easily-releasable protective film provided on a front surface of the optical film through a pressure-sensitive adhesive layer or an easily-releasable protective film provided on a back surface of the optical film through a pressure-sensitive adhesive layer.

7. The method of claim 1, wherein the opposed end faces of the optical films are each substantially perpendicular to their front and back surfaces.

8. A method for manufacturing a combination-type optical film comprising a plurality of optical films each having at least one end face at which the optical films are opposed to one another, comprising the steps of:
 (1) opposing the end faces of the optical films to one another with a gap provided therebetween;
 (2) entirely holding the opposed portions of the optical films with a holding member placed on at least one side;
 (3) connecting an organic solvent- or adhesive-containing vessel to one side of the gap between the opposed portions of the optical films to charge the organic solvent or the adhesive into the gap with the aid of a negative pressure state; and
 (4) removing the organic solvent or the adhesive under reduced pressure to bond the opposed end faces to one another,
 wherein the opposed end faces of the optical films are each flat and inclined from the front surface to the back surface of the optical film.

9. The method of claim 1, wherein in the step (1), the optical films are opposed to one another in such a manner that the gap between the opposed end faces has a width of 50 μm or less.

10. The method of claim 1, wherein at least a surface of the holding member used in the step (2) is made of a fluororesin or a silicone resin.

11. An apparatus for manufacturing a combination-type optical film comprising a plurality of optical films each having at least one end face at which the optical films are opposed to one another, comprising:
 a holding member or holding members for entirely holding the opposed portions of the optical films from both sides in a state where the end faces of the optical films are opposed to one another with a gap provided therebetween;
 an organic solvent- or adhesive-containing vessel to be connected to one side of the gap; and
 a vacuum pump to be connected to another side of the gap,
 wherein the holding members for holding from both sides are each a flat plate,
 the holding members for holding from both sides include an upper holding member of a flat plate and a lower holding member that is a support having a recessed cross-sectional shape,
 protrusions on both sides in the recessed cross-section have through holes,
 a recessed portion in the recessed cross-section has a groove communicating with the through holes on both sides,
 the organic solvent- or adhesive-containing vessel is connected to one of the through holes, and
 the vacuum pump is connected to another of the through holes.

12. The method of claim 6, wherein the opposed end faces of the protective film-carrying optical films are each substantially perpendicular to their front and back surfaces.

13. The method of claim 6, wherein the opposed end faces of the protective film-carrying optical films are each flat and inclined from the front surface to the back surface of the optical film.

14. The method of claim 6, wherein in the step (1), the protective film-carrying optical films are opposed to one another in such a manner that the gap between the opposed end faces has a width of 50 μm or less.

* * * * *